United States Patent
Lackemann (10) Patent No.: US 7,857,219 B2
(45) Date of Patent: Dec. 28, 2010

(54) IMAGING READER TARGET OBJECT FINDER SYSTEM

(75) Inventor: Thomas E. Lackemann, Sayville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1061 days.

(21) Appl. No.: 11/441,852

(22) Filed: May 26, 2006

(65) Prior Publication Data

US 2007/0272754 A1 Nov. 29, 2007

(51) Int. Cl.
*G06K 7/10* (2006.01)

(52) U.S. Cl. .............................. 235/462.01; 235/462.41

(58) Field of Classification Search ............ 235/462.08, 235/462.09, 462.41, 462.1
See application file for complete search history.

(56) References Cited

U.S. PATENT DOCUMENTS

| 4,251,798 A | 2/1981 | Swart et al. |
| 4,369,361 A | 1/1983 | Swart et al. |
| 4,387,297 A | 6/1983 | Swart et al. |
| 4,409,470 A | 10/1983 | Shepard et al. |
| 4,760,248 A | 7/1988 | Swart et al. |
| 4,896,026 A | 1/1990 | Krichever et al. |
| 6,073,849 A * | 6/2000 | Colley et al. ........... 235/462.27 |
| 6,405,925 B2 | 6/2002 | He et al. |
| 2002/0020747 A1* | 2/2002 | Wakamiya et al. ...... 235/462.11 |

* cited by examiner

Primary Examiner—Karl D. Frech (57) ABSTRACT

A method and apparatus for reading a target object with an image reader that includes an illumination source that illuminates an area corresponding to an indicia area when the imager is acting within an operating range of the indicia, a two-dimensional array sensor capable of collecting data from a captured image corresponding to an image reflected from the indicia area by the illumination source when the imager is acting within the operating range of the indicia, a starting coordinate located substantially about the center of the captured image, and a processing source including a search routine originating at the starting coordinate capable of analyzing the captured image by employing a plurality of scan paths associated to an algebraic equation.

29 Claims, 5 Drawing Sheets

IMAGING READER TARGET OBJECT FINDER SYSTEM

FIELD OF THE INVENTION

The present invention relates generally to a field of imaging readers and scanners and more particularly to a field of imaging readers and scanners that utilize a strategic search routine for locating a target object.

BACKGROUND

Various electro-optical systems have been developed for reading optical indicia, such as bar codes. A bar code is a coded pattern of graphical indicia comprised of a series of bars and spaces of varying widths, the bars and spaces having differing light reflecting characteristics. Some of the more popular bar code symbologies include: Uniform Product Code (UPC), typically used in retail stores sales; Code 39, primarily used in inventory tracking; and Postnet, which is used for encoding zip codes for U.S. mail. Systems that read and decode bar codes employing charged coupled device (CCD) or complementary metal oxide semiconductor (CMOS) based imaging systems are typically referred to hereinafter as imagining systems, imaging readers, imaging reader systems or bar code scanners.

Imaging reader systems electro-optically transform the graphic indicia into electrical signals, which are decoded into alphanumerical characters that are intended to be descriptive of the article or some characteristic thereof. The characters are then typically represented in digital form and utilized as an input to a data processing system for various end-user applications such as point-of-sale processing, inventory control and the like. Scanning systems of this nature have been disclosed for example, in U.S. Pat. Nos.: 4,251,798; 4,369,361; 4,387,297; 4,409,470; 4,760,248; and 4,896,026, all of which have been assigned to the assignee as the instant application.

Imaging readers employing CCD type technology typically use an illumination system to flood a target object with illumination from a light source such as a light emitting diode (LED) in the reader, and each CCD cell is sequentially read-out to determine the individual spacing in the bar code. Imaging systems include CCD arrays, CMOS arrays, or other imaging pixel arrays having a plurality of photosensitive elements or pixels. Light from the light source or LED is reflected from a target object, such as a bar code. The reflected light is then focused through a lens of the imaging system onto the pixel array, the target object being within a field of view of the lens. An analog-to-digital converter then digitizes output signals generated from the pixels of the pixel array. Decoding circuitry of the imaging system then processes the digitized signals and attempts to decode the imaged bar code.

Imaging readers are increasingly replacing laser type scanners that were utilize for many different applications. This is a result of the imaging readers' ability to offer more features than laser scanners, such as reading two-dimensional bar codes and capturing images such as checks and identification documents. A two-dimensional imaging reader is characterized by a photosensor array having multiple rows and multiple columns, that is an M×N array of M rows and N columns of photosensors or pixels. However, when processing one-dimensional bar codes, a laser scanner can often outperform an imager, especially a high-resolution imager. This is because of the additional time required for the imager to capture and process or search the entire image. In addition, the recent introduction of a megapixel sensor more than doubles the image resolution of earlier readers increasing from a 659×494 image to a now 1280×1024 image size, which as a result, increases the capture and process time. The evolution of the large pixel imaging results in longer time durations for image decoding because of the time needed to find the target object or bar code located within the captured image. Further processing time is wasted in existing imaging readers that focus a search in the outer extremes of the captured image, since it is less likely that the outer extremes would contain the intended target.

What is needed is a faster and more efficient approach to finding and decoding a target object or bar code.

SUMMARY

The imaging reader target object finder system herein provides an efficient and expeditious approach to locating a target object or bar code captured in the image of an imaging reader. Because there is a greater probability that a target object such as a bar code is located about the center of a captured image, a strategic search routine originates at such location within the image. The strategic search routine then analyzes information content from data blocks along a plurality of sequential scan paths that progress outwardly from a centrally located starting position. The data blocks or information content can be for example groups or individual pixels that provide information typically by variations in contrast between blocks. Each block of data along the scan paths, or a prescribed percentage thereof, is evaluated to determine whether the target object is detected and decodable. If the routine detects a target object, a decoding operation is initiated. If the decoding operation is successful the strategic search routine process is terminated. The routine is also terminated if the scan path exceeds a predesigned limit in the search region of the captured image. After a prearranged number of data blocks or pixels are evaluated along a strategic search routine scan path, a step function occurs, moving the strategic search routine outwardly from the originating, centrally located position to a new search or scan path. The step function operation can occur multiple times during a single search of a captured image.

In one embodiment, only a partial number of data blocks or pixels along the strategic search routine are evaluated. In another embodiment, the strategic search routine scan paths are programmed to follow an algebraic equation. In yet another embodiment, the scan path is programmed to follow a geometrical pattern, such as a circular or spiral path, progressing outwardly from the originating point by a step function.

The step function can be proportional to the distance from the center originating point, increasing a substantially equal amount for each step, or increasing the step distance by some factor. For example, increasing the step distance by an amount equal to the distance from the existing path to the originating point would be a factor of (2) two, that is each step would have values of ½, 1, 2, 4, 8 units, and continues accordingly. The step function value can also be based on the density of the data blocks evaluated and the spacing therebetween. For example, it would be more desirable in areas having a low level of information content or little variation in contrast between data blocks to increase the distance in each step.

These and other objects, advantages, and features of the exemplary embodiments are described in detail in conjunction with the accompanying drawings.

DETAILED DESCRIPTION OF THE DRAWINGS AND PREFERRED EMBODIMENTS

Figure 1:
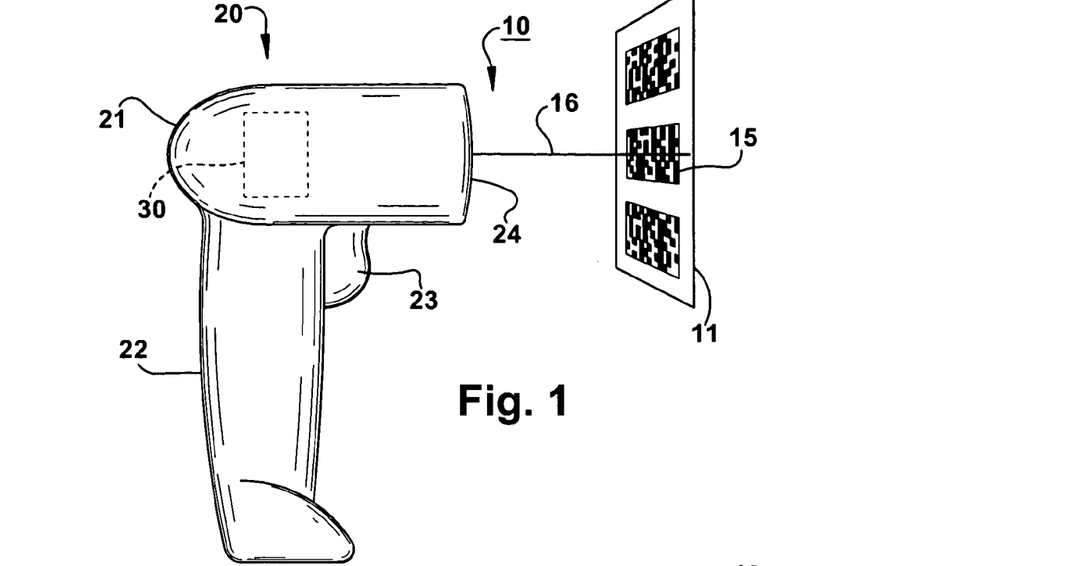
FIG. 1 is side view of a handheld imaging reader acting upon a two-dimensional target object.

FIG. 1 shows an imaging reader system 10 that includes a handheld imaging reader or scanner 20 acting upon a surface 11 having a plurality of two-dimensional target objects 15, such as bar codes. For the purpose of this description, a handheld imaging reader will be discussed. However, it should be recognized that the imaging reader 20 of the present invention, to be explained below, may be advantageously used in connection with any type of imaging-based automatic identification system including, but not limited to, bar code scanners, signature imaging acquisition and identification systems, optical character recognition systems, fingerprint identification systems and the like. It is the intent of the present invention to encompass all such imaging-based automatic identification systems.

The handheld imaging reader 20 includes a housing 21 having a handle portion 22 adapted to be gripped by a user. A scan engine 30 that includes scanner components that perform functions such as imaging, control, and decoding is mounted within the head of the imaging reader 20. A user initiates the image reading process by engaging a trigger 23 located along handle portion 22.

The imaging reader once activated by the trigger 23 captures a two-dimensional image 32 that is a reflection from a light beam 16 emitted from the reader 20. The light beam 16 reflects off the surface image 11 back the image reader 20 through a window 24 to imaging components within the reader.

Figure 2:
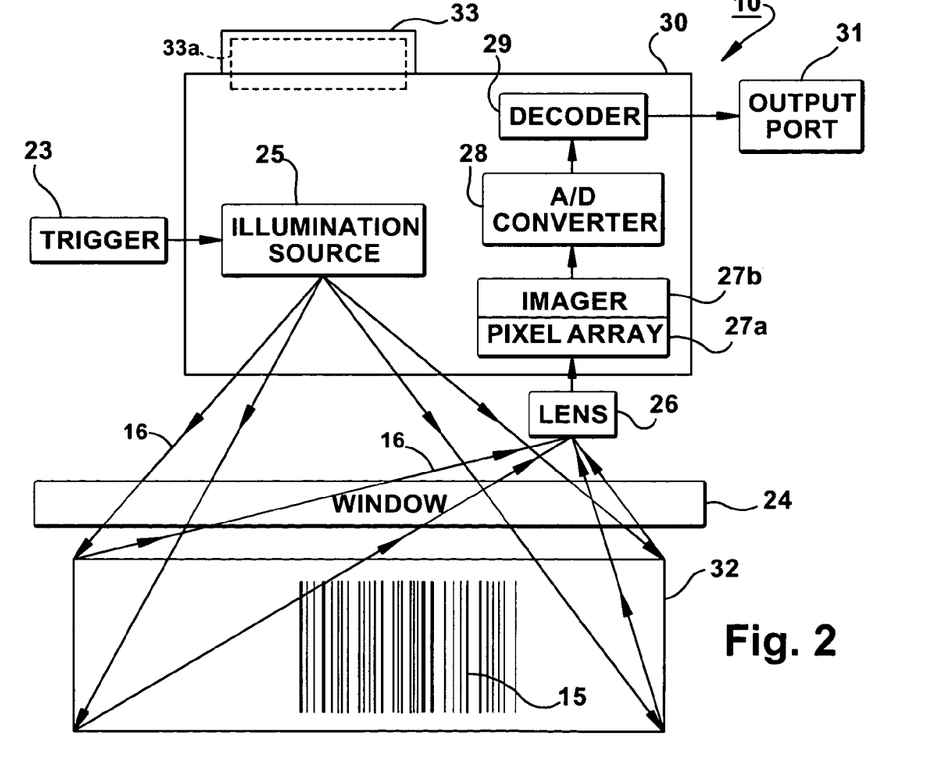
FIG. 2 is a function block diagram of an imaging reader system constructed in accordance with an embodiment of the present invention.

Referring now to FIG. 2 is a functional block diagram of an imaging reader system 10 capturing a two-dimensional image 32. The engagement of the trigger 23 enables the projection of a light beam 16 from an illumination source 25 through the window 24, and the beam 16 is typically directed by a user toward the target object 15. The illumination source 25 illuminates an image 32 that is reflected from the surface 11, typically including the target object 15 back toward the reader 20 through a lens 26. The typical illumination source is capable, within a prescribed scanner range, of illuminating a portion of the target surface sufficient to fill an entire two-dimensional pixel array 27a of sensors with information content such as data blocks comprising a pixel or group of pixels. The lens 26 focuses the reflected image 32 onto the pixel array 27a that is tied and captured on an imager 27b. The two-dimensional pixel array produces a data grid corresponding to the reflected image 32 from the target. It should be appreciated by those skilled in the art that the pixel array 27a and imager 27b could be either a charged coupled device (CCD) or complementary metal oxide semiconductor (CMOS) based imaging type both having two-dimensional array of sensors that sense the reflected light and form pixel data corresponding to an image of the target object 15. The illumination source 25 typically originates from a light emitting diode (LED) or a bank of LEDs.

An analog to digital ("A/D") converter 29 located in the scan engine 30, receives the stored analog image from the imager 27b. The A/D converter 28 then sends a digital signal to a decoder 29 where it becomes synthesized by the decoder's internal circuitry. An example of such a sensor is Micron Technology Inc. CMOS image sensor part number MT9M001. However, the A/D converter 28 and decoder 29 do not have to be incorporated into the scan engine, and may be housed in separate scanner components. The scan engine 30 is associated to a microprocessor 33 that is connected to the imaging reader 20. The microprocessor 33 assists in processing and decoding the image into a data stream through firmware 33a. The firmware 33a is embedded within the microprocessor 33 or scan engine 30 onto for example, flash Read Only Memory (ROMs) or as a binary image file that can be programmed by a user. The program within the firmware includes various strategic search routines that employ the various scan paths 40 of the present invention. If the decode is successful, the decode session is terminated with the decoded information being transmitted to an outlet port 31, which could be tied to a number of reader peripherals. These would include for example, visual display devices such as a monitor or LED, a speaker, or the like.

Figure 3:
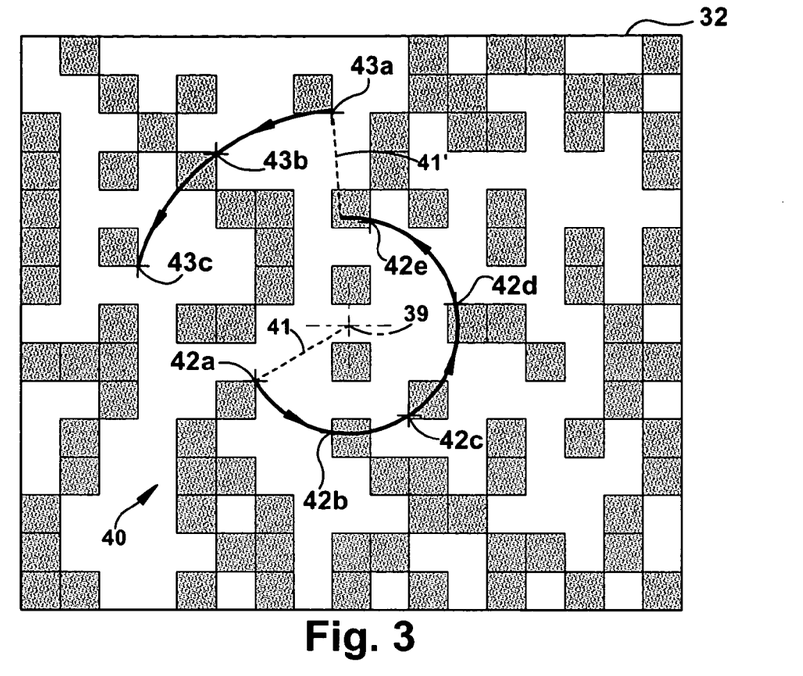
FIG. 3 is a captured image depicting a strategic search routine scan paths of one embodiment.

FIG. 3 depicts a strategic search routine scan paths of one embodiment transitioning about a captured image 32. In this embodiment, the routine originates about a central location of the image at a starting coordinate 39. The central location of the image can be calculated by processing techniques executed by the microprocessor 33. For example, assigning a grid of the two-dimensional image 32 and positioning the starting coordinate based on coordinates of a known resolution allows an approximate center to be calculated.

Once the starting coordinate 39 is calculated, a program residing in the firmware 33a initiates a strategic search routine 40 that include a plurality of sequential scan paths. A first path 42 is begins from the starting coordinate 39 incrementing a distance or a first step 41 to a first data block or by moving to a prescribed distance. In the illustrated embodiment of FIG. 3, the step 41 is incremented to a prearranged distance and positioned upon a data block 42a along the first scan path 42. The first path 42 transitions is along a plurality of information content represented for simplicity as data blocks 42b, 42c, 42d, and 42e, although hundreds to thousands of data blocks could be evaluated along any given scan path. The microprocessor 33 or scan engine 30 attempts to decode the data blocks searching for the target object 15, and if successfully detected, the strategic search routine scan path operation 40 is terminated. Successful detection of the target object can be achieved through, for example employing autodiscrimination techniques as described in U.S. Pat. No. 6,405,925 issued to He et al. on Jun. 18, 2002, assigned to the assignee of the present invention and incorporated by reference in its entirety.

After a prescribed number of scans along the first path 42 are reached, a second step 41' is incremented outward from the first scan path 42 to second scan path 43. In the illustrated embodiment of FIG. 3 each step 41 is an equal distance outward for each scan path 40. The second path 43, like the first path is made up of a plurality of data blocks represented as 43a, 43b, and 43c, but could be thousands of data blocks along any given path.

Figure 5:
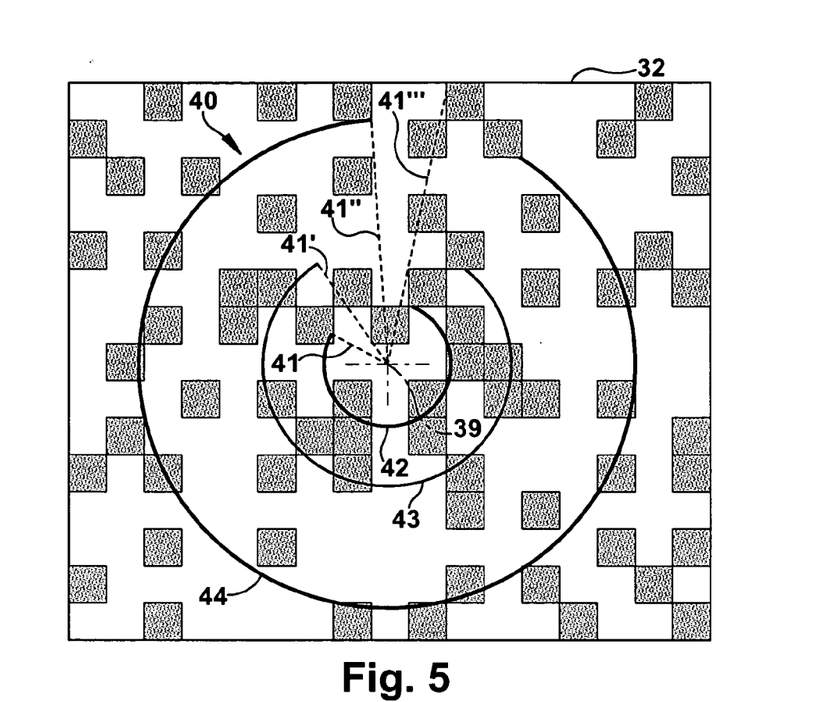
FIG. 5 is a captured image depicting a strategic search routine scan paths of a third embodiment.
Figure 6:
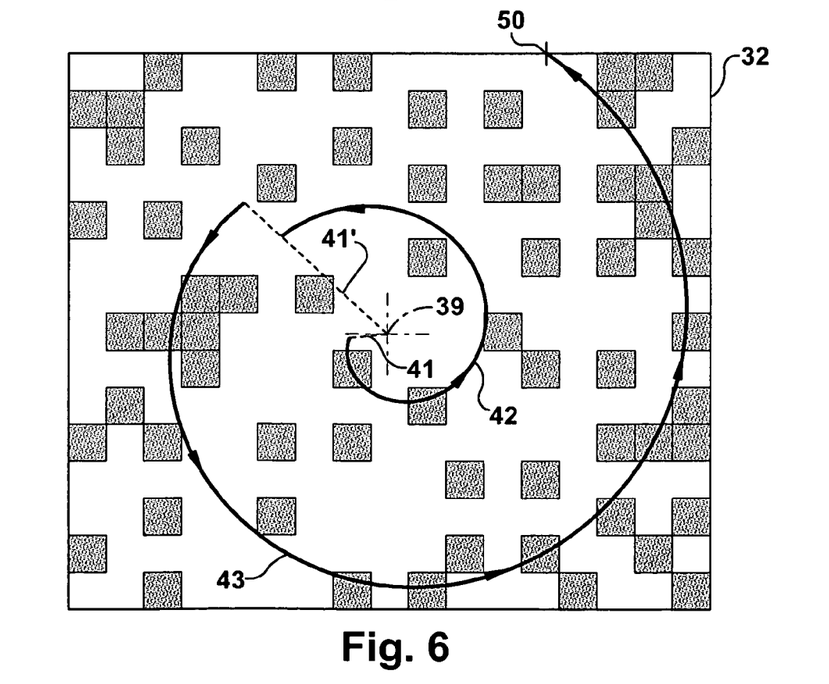
FIG. 6 is a captured image depicting a strategic search routine scan paths of a fourth embodiment.
Figure 8:
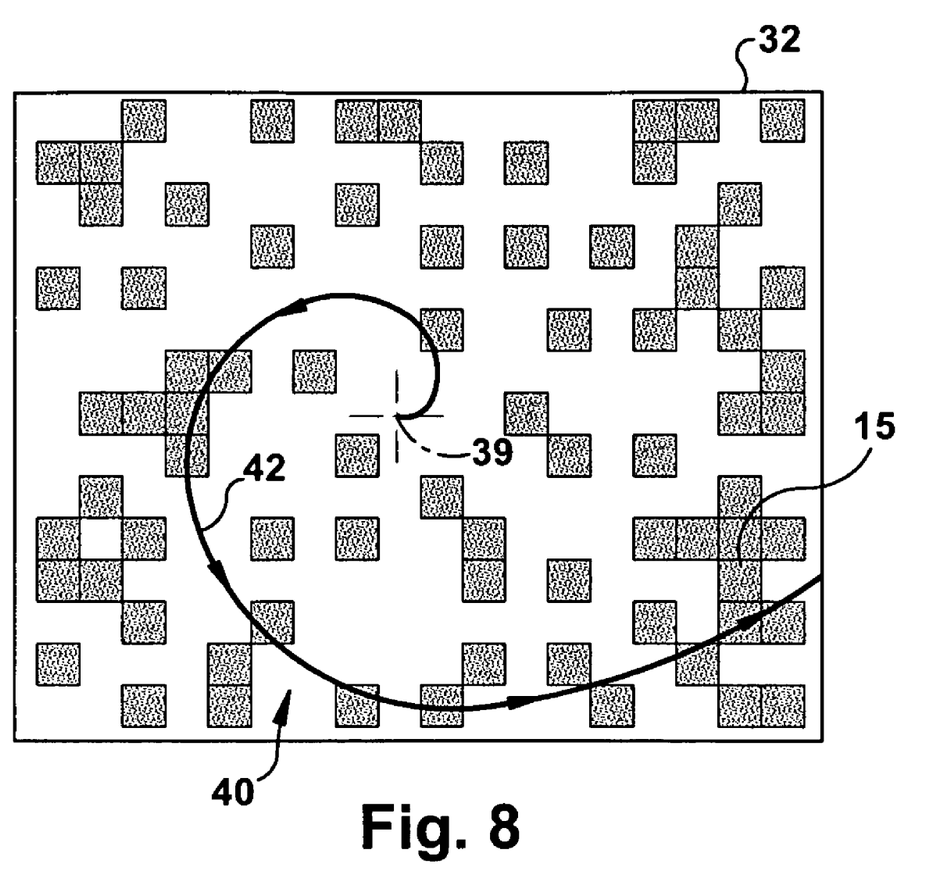
FIG. 8 is captured image depicting a strategic search routine scan paths acting upon the captured image and engaging a target object.

After a prearranged number of scans take place along the second path by the microprocessor 33, a subsequent path is initiated further outward from the proceeding path by a subsequent, but substantially equal step. The process continues until a successful decode occurs (as shown in FIG. 8) or until a limit 50 is reached, as depicted in FIG. 5. The limit value 50 can be modified by varying the limit value established in the firmware 33a associated with the microprocessor 33 or scan engine 30. In the illustrated embodiment of FIG. 3, the scan path 40 is substantially circular, but an unlimited number of path configurations could be programmed into the firmware 33a by varying the algebraic equations or algorithms in the program without departing from the spirit and scope of the claimed invention. For example, in the illustrated embodiment of FIG. 6, a substantially spiral strategic search routine scan path 40 is followed and extending outward from the starting coordinate 39.

Figure 4:
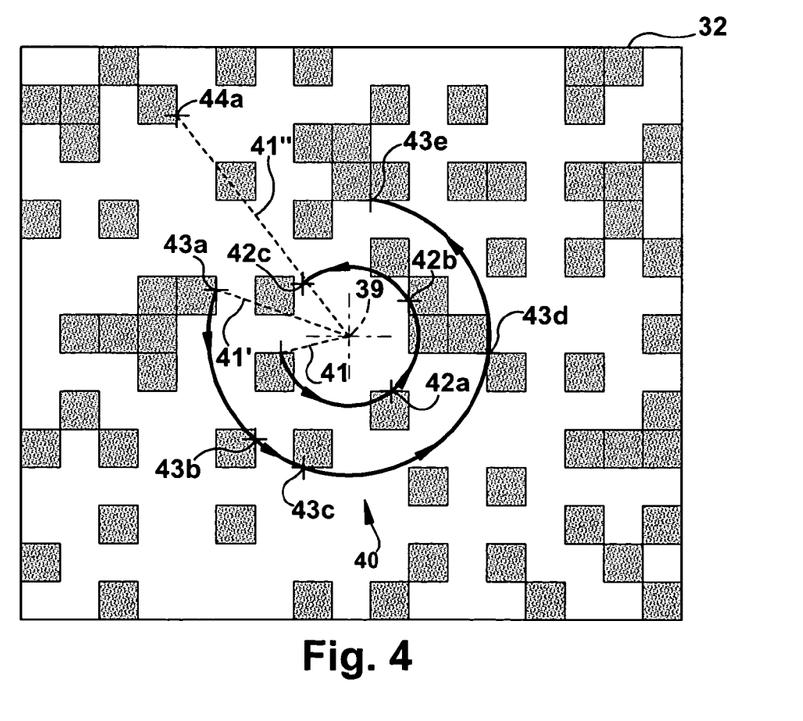
FIG. 4 is a captured image depicting a strategic search routine scan paths of a second embodiment.

In one exemplary embodiment, each step 41, 41', 41" . . . is increased by a factor, thus the distance from the starting coordinate 39 increases with each subsequent scan path 40 because of the increasing step distance. FIG. 4 represents just one possible strategic search routine having a number of sequential scan paths 40 each increasing outwardly by a prescribed factor. In the first scan path represented by 42a-42b includes a step 41 that equates to a half unit. The second scan path represented by 43a-43e includes a step 41' equating to a full unit. The third path initiating at 44a increases by a step 41" equating to two units and the step increment continues to double in the illustrated embodiment by a factor of two until a prescribed limit 50 is reached in the microprocessor 33, or a successful decoding operation occurs in a scan path 40.

In yet another embodiment, the strategic search routine scan paths 40 are a function of the data block density. For example, the closer the proximity of corresponding data blocks along any given path, the shorter the distance will be of the incremented step 41 to a subsequent scan path. Such an embodiment is illustrated in FIG. 5.

Figure 7:
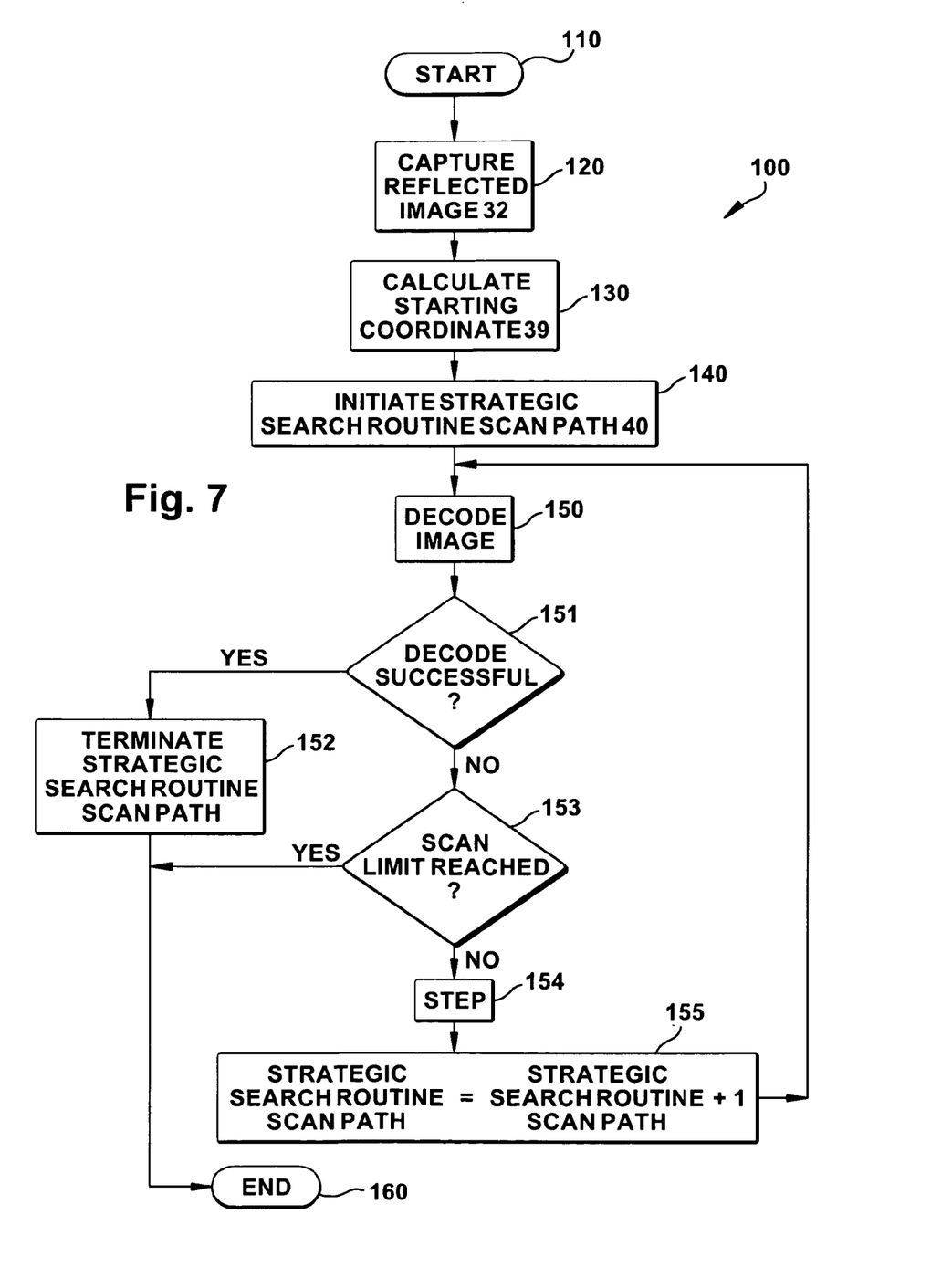
FIG. 7 is a flowchart illustrating a method of operating an imaging reader according to embodiments of the present invention.

FIG. 7 is a flowchart outlining a method 100 of operation of the strategic search routine scan path operation of the imaging reader system 10. Activation of the system occurs at 110. The reflected image 32 is captured at 120 by an imager typically located within the scan engine 30. The microprocessor 33 then calculates the starting coordinate 39 at 130. Once the starting coordinate is calculated the microprocessor initiates the strategic search routine scan path at 140. At this stage of the operation, data block along the scan path 40 are analyzed and attempts are made to decode the imaged data at 150. If at any point along the path the decoding operation is successful at 151, the strategic search routine scan path is terminated at 152. The strategic search routine scan path will also terminate if internal limits are exceeded, such as time or distance from the starting coordinate as identified at 153. If no foregoing termination conditions are encountered, the operation increments the scan path by a prescribed step at 154 from the starting coordinate 39. After taking the incremental step 41 at 154, the strategic search routine scan increases by one to a subsequent scan path at a greater distance from the starting coordinate than the previous scan path.

It should be appreciated that the strategic search routine scan path at 140 can be any of the previously described paths in the discussed embodiments. The method of operation 100 could include the prior scan paths having a step that was substantially equal between each path, increased by a factor for each path, increased as a function of the data block density surrounding the path, a path that follows an algebraic equation, or a path that follows a geometrical equation, such as a circular path, or spiral path.

The following presents pseudo-code for an exemplary embodiment as an example of a program for a strategic search routine 40. The previous discussion makes it clear how the various embodiments can be implemented by modifying the pseudo-code below.

```
CurrentPoint = StartingCoordinate
WHILE CalculatedDistance(CurrentPoint) < SearchRegionLimit DO
REM execute search routine at CurrentPoint and break out if target object
is decoded
    IF CalculateDistance(CurrentPoint) < TightRegionLimit THEN
        CurrentPoint = AdvancedFinderBy(1)
    ELSE
        CurrentPoint =
        AdvancedFinderBy(CalculateDistance(CurrentPoint))
    END IF
END WHILE
```

It can be seen from the foregoing description that an imaging reader that includes a strategic search routine having scan paths can more quickly locate the target object within a captured image. Although the invention has been described with a certain degree of particularity, it should be understood that various changes can be made by those skilled in the art without departing from the scope of the invention hereinafter claimed.

I claim:

1. An image reader that processes indicia for locating a target object comprising:
   a. an illumination source that illuminates an area corresponding to an indicia area when the imager is acting within an operating range of the indicia;
   b. a two-dimensional array sensor capable of collecting data from a captured image corresponding to an image reflected from said indicia area by said illumination source when the imager is acting within the operating range of the indicia;
   c. a calculated starting coordinate; and
   d. a processing source including a search routine originating at said starting coordinate capable of analyzing said captured image by employing a plurality of scan paths associated to an algebraic equation, wherein the search routine searches for a location of the target object by analyzing the data blocks along each scan path.

2. The image reader of claim 1, wherein said algebraic equation includes a first step function value for advancing the location of said scan paths from a first scan path to a second scan path, the second scan path positioned outwardly from the first scan path.

3. The image reader of claim 2, wherein said algebraic equation includes a second step function value for advance the location said scan paths from said second scan path to a third scan path, the third scan path positioned outwardly from the second scan path.

4. The image reader of claim 3, wherein said first step function value is substantially equal to said second step function value.

5. The image reader of claim 3, wherein said second step function value is a factor of said first step function value.

6. The image reader of claim 1 further comprising a plurality of step functions for incrementing a distance between each of said plurality of scan paths.

7. The imager reader of claim 6, wherein a distance associated with each of said step functions is proportional to data block density surrounding a corresponding scan path.

8. The image reader of claim 1, wherein said search routine is a geometric equation.

9. The image reader of claim 8, wherein said geometric equation is a circular equation.

10. The image reader of claim 8, wherein said geometric equation is a spiral equation.

11. The image reader of claim 1, wherein said search routine is adapted such that a target object can be located in said captured image in a shorter amount of time than is required to search the entire captured image.

12. The image reader of claim 1, wherein said search routine includes a range limit such that said scan path terminates if the value of the scan path exceeds the range limit.

13. The image reader of claim 1, wherein said processing source is a microprocessor.

14. The image reader of claim 1, wherein said processing source is a scan engine.

15. The image reader of claim 1, wherein said image reader is a bar code scanner and the target object is a bar code that is imaged and decoded.

16. The image reader of claim 1, wherein said two-dimensional array sensor is a charged coupled device sensor.

17. The image reader of claim 1, wherein said two-dimensional array sensor is a complementary metal oxide semiconductor sensor.

18. The image reader of claim 1, wherein said starting coordinate is substantially located about the center of said captured image.

19. A method of searching indicia for a target object using an image reader comprising:
   a. obtaining a captured image on a two-dimensional array sensor;
   b. calculating an approximate center of said captured image;
   c. positioning a starting coordinate about said calculated approximate center of the captured image;
   d. executing a search routine about said captured image originating from said approximate center that searches for a location of the target object by analyzing data blocks of the captured image along a scan path; and
   e. transitioning said scan path outwardly from said starting coordinate.

20. The method of searching indicia for a target object of claim 19 further comprising terminating the search routine if when analyzing the data blocks of the captured image a target image is detected.

21. The method of searching indicia for a target object of claim 19 further comprising terminating the search routine if when analyzing the data blocks of the captured image an internal limit of the search routine is reached.

22. The method of searching indicia for a target object of claim 21, wherein said limit is a function of time.

23. The method of searching indicia for a target object of claim 21, wherein said limit is a function of distance from the starting coordinate.

24. The method of searching indicia for a target object of claim 19 wherein said scan path includes a plurality of sequential scan paths for analyzing the data blocks along the captured image wherein a first of said sequential scan paths originates at said starting coordinate and transitions outwardly therefrom, and subsequent sequential scan paths transition from each proceeding sequential scan path outwardly therefrom.

25. The method of searching indicia for a target object of claim 24 further providing a plurality of step functions between each of said plurality of sequential scan paths.

26. The method of searching indicia for a target object of claim 19, wherein said analyzing data blocks includes comparing the contrast between pixels or groups of pixels found within said captured image.

27. Computer-readable media having computer-executable instructions for performing a method of searching indicia for a target object using an image reader, the instructions comprising the steps of
   calculating an approximate center of a captured image;
   positioning a starting coordinate about said calculated center of the captured image;
   executing a search routine about said captured image originating from said starting coordinate for analyzing data blocks along a plurality of sequential scan paths to search for a location of the target object; and
   transitioning a first of said plurality of sequential scan paths outwardly from said starting coordinate and transitioning outwardly each subsequent scan path from the preceding scan path.

28. The computer-readable media of claim 27 wherein the instructions for performing the step transitioning a first of said plurality of sequential scan paths outwardly from said starting coordinate and transitioning outwardly each subsequent scan path from the preceding scan path includes incrementing a step at a distance between each of said plurality of sequential scan paths.

29. Apparatus for locating a target object within a captured image comprising:
   a. means for illuminating an area corresponding to an indicia area when an imager is acting within an operating range of the indicia;
   b. means for capturing an image indicative of the image reflected from said indicia area by the illumination means when the imager is acting within the operating range of the indicia;
   c. means for substantially locating the center of said captured image that locates a starting coordinate; and
   d. means for processing a search routine that originates at said starting coordinate such that said search routine includes means for finding a location of the target object by analyzing data blocks along a plurality of scan paths associated to an algebraic equation.

* * * * *

UNITED STATES PATENT AND TRADEMARK OFFICE
CERTIFICATE OF CORRECTION

PATENT NO. : 7,857,219 B2  
APPLICATION NO. : 11/441852  
DATED : December 28, 2010  
INVENTOR(S) : Lackemann Page 1 of 1

It is certified that error appears in the above-identified patent and that said Letters Patent is hereby corrected as shown below:

In Column 1, Line 25, delete "imagining" and insert -- imaging --, therefor.

In Column 7, Line 6, in Claim 7, delete "imager" and insert -- image --, therefor.

In Column 8, Line 24, in Claim 27, delete "of" and insert -- of: --, therefor.

Signed and Sealed this
Seventeenth Day of July, 2012

David J. Kappos
*Director of the United States Patent and Trademark Office*